United States Patent [19]
Abbott et al.

[11] Patent Number: 5,978,135
[45] Date of Patent: Nov. 2, 1999

[54] ARTICLE COMPRISING A VARIABLE OPTICAL ATTENUATOR

[75] Inventors: Robert Ralph Abbott, Westfield; George Wayne Berkstresser, Bridgewater; Charles David Brandle, Jr.; Vincent Jerome Fratello, both of Basking Ridge; Steven Joy Licht, Bridgewater, all of N.J.

[73] Assignee: Lucent Technologies Inc., Murray Hill, N.J.

[21] Appl. No.: 09/304,287

[22] Filed: May 3, 1999

[51] Int. Cl.$^6$ ........................................ G02B 5/30
[52] U.S. Cl. .......................... 359/484; 359/321; 359/324
[58] Field of Search ..................... 359/280, 281, 359/321, 322, 324, 484

[56] References Cited

U.S. PATENT DOCUMENTS

| | | | |
|---|---|---|---|
| 4,218,762 | 8/1980 | Haisma et al. | 365/32 |
| 4,981,341 | 1/1991 | Brandle, Jr. et al. | 350/377 |
| 5,608,570 | 3/1997 | Brandle, Jr. et al. | 359/321 |

OTHER PUBLICATIONS

Wolfe et al., Appl. Phys. Lett. "Fiber Optic Magnetic Sensor Based on Domain Wall motion in Garnet Film Waveguides", vol. 58(16), pp. 1733–1735, Apr. 22, 1991.

Fukushima et al., OSA TOPS on Optical Amplifiers and Their Applications, Optical Society of America, "Non–Mechanical Variable Attenuator Module Using Faraday Effect", vol. 5, pp. 249–252, 1996.

Winkler, Vieweg Tracts in Pure and Applied Physics, Magnetic Garnets, vol. 5, 1981.

*Primary Examiner*—Cassandra Spyrou
*Assistant Examiner*—Craig Curtis
*Attorney, Agent, or Firm*—Eugen E. Pacher

[57] ABSTRACT

In an arrangement substantially like an optical isolator, appropriate choice of the composition of the magneto-optic element can result in a variable optical attenuator. The composition is selected to vary in the direction of light propagation, and also is selected such that the magneto-optic element comprises a compensation wall. The compensation wall is movable in response to a change in the temperature of the magneto-optic element, whereby the attenuation of the device is changed.

13 Claims, 3 Drawing Sheets

ARTICLE COMPRISING A VARIABLE OPTICAL ATTENUATOR

FIELD OF THE INVENTION

This invention pertains to articles and systems (collectively "articles") that comprise a variable optical attenuator.

BACKGROUND OF THE INVENTION

Variable optical attenuators potentially have a variety of important uses in optical communication systems. For instance, in wavelength division multiplexed (WDM) systems they could be used to tune the wavelength dependent gain of fiber amplifiers such that all wavelengths of interest have substantially the same gain. Variable optical attenuators exemplarily could also be used to compensate for variable input strengths to achieve a constant output, or to compensate for variable path length attenuation to produce equal strength signals. Desirably, variable attenuators for optical communication systems have attenuation up to about 20–25 dB, and insertion loss of about 1.5 dB or less.

The prior art knows several types of variable optical attenuators, including mechanical ones. See, for instance, S. Masuda, *Applied Optics*, Vol. 19, p. 2435 (1980), and W. L. Emkey, *Optics Letters*, Vol. 8, p. 94 (1983). Mechanical devices are unlikely to achieve the speed required for high bit rate systems. R. Wolfe et al., *Applied Physics Letters*, Vol. 58, p. 1733 (1991) suggested a device based on a single domain wall in a magnetooptic waveguide. Such a device however would be costly to fabricate, and have high insertion loss for coupling to fiber. Fukushima et al., (Optical Society of America TOPS on Optical Amplifiers and Their Applications, 1996, Vol. 5, 1996 OAA Program Committee (eds), pp. 249–252), have disclosed a thick magnetic film with in-plane magnetization, where the direction of the magnetization in the plane depends on a relatively small magnetic bias field. The Faraday rotation in the direction of light propagation depends on the cosine of the angle between the magnetization and the direction of propagation. This approach has drawbacks with the in-plane coupling of light and the non-uniformity of magnetization with bias field because of the cubic magnetic anisotropy of the film.

In view of the many potential uses of variable optical attenuators, it would be desirable to have available a compact, low power device having a significant tuning range. This application discloses such a device.

It is known that rare earth iron garnets (RIGs) are ferromagnetic, with three inequivalent metal ion sites (octahedral, tetrahedral, and dodecahedral). The net saturation magnetization $M_s$ of a RIG of interest herein is given by $$M_s(T) = |\pm M_c(T) - M_a(T) + M_d(T)|, \quad (1)$$

where $M_c$, $M_a$ and $M_d$ are the sublattice magnetizations of the dodecahedral, octahedral and tetrahedral sublattices, respectively, and T is the absolute temperature. FIG. 1 schematically shows the sublattice magnetization as a function of temperature of the three sublattices of an exemplary RIG, and FIG. 2 shows the resulting net magnetization as a function of temperature.

As can be seen from FIG. 1, the rare earth contribution, for heavy rare earth's (Gd to Yb), is large at low temperatures but is substantially negligible at high temperatures. Consequently, such RIGs can exhibit magnetic compensation (i.e., zero saturation magnetization) at some temperature below the Curie temperature. This is illustrated in FIG. 2, where the compensation temperature is about 250 K and the Curie temperature is about 500 K. The temperature dependence of the rare earth moment is highest for Gd and decreases steadily through the heavy rare earths. Data for Tb, Ho and Yb are shown in FIG. 3.

Like the saturation magnetization, the Faraday rotation $\theta_F$ of the iron garnets is also a linear combination of the sublattice magnetizations, but with different constants of proportionality. Specifically, the Faraday rotation is $$\theta_F(T,\lambda) = C(\lambda)M_c(T) + A(\lambda)M_a(T) + D(\lambda)M_d(T), \quad (2)$$

where $\lambda$ is the wavelength of the light that experiences the Faraday rotation and $C(\lambda)$, $A(\lambda)$ and $D(\lambda)$ are the wavelength dependent magnetooptic coefficients of the dodecahedral, octahedral and tetrahedral sublattices, respectively. As a result of the different constants of proportionality, the Faraday rotation of a RIG of interest herein typically does not go to zero at the compensation temperature. However, when the material passes through the magnetic compensation temperature, the sign of the saturation magnetization changes with respect to the sublattice magnetizations, and therefore with respect to the Faraday rotation.

If the material is in a saturating applied magnetic field, as occurs in many device applications, passing through the compensation temperature results in sign changes in the sublattice magnetizations, so that the net magnetization will remain aligned with the applied field. When this occurs, the Faraday rotation also changes sign (but not magnitude) in a step function, along with the changes in sublattice magnetization in accordance with equation (2) above. This is shown schematically in FIGS. 4 and 5, and graphically in FIG. 6. If such changes occur in a magnetooptic device such as an isolator, the device will also reverse its function, isolating in the forward direction and propagating light in the backward direction, typically rendering the device useless for normal operations.

It should however be noted that if the material is sufficiently coercive to remain saturated without a magnetic field present (see, for instance, U.S. Pat. No. 5,608,570), passing through the compensation temperature has the opposite effect in the absence of an applied field. Namely, the saturation magnetization changes direction as it passes through zero, and the sign of the Faraday rotation is unchanged because the sublattice magnetization will remain in the same direction.

The compensation temperature of a particular RIG material generally is determined by the combined effects of the dodecahedral ions (particular the concentration of heavy rare earths) and the diamagnetic substitution on the iron sites. As the temperature is raised or lowered through the compensation temperature in an applied magnetic field, the sublattice magnetization will change sign, as shown schematically in FIGS. 4 and 5. This typically occurs by a process of nucleation and growth of a region (or regions) of reverse sublattice magnetization into the existing domain. During this process, these magnetic domains with differently ordered sublattices are separated by a special kind of magnetic domain wall, generally referred to as a "compensation wall". The sublattices on one side of the compensation wall are oriented antiparallel to the corresponding sublattices on the other side of the compensation wall. The compensation wall has somewhat less energy than a randomly oriented domain wall, but its nucleation still requires some energy. Consequently, there is hysteresis in switching a material of uniform composition, similar to the nucleation-induced coercivity in Latching™ Faraday rotators.

For further detail on compensation walls, see for instance "Magnetic Garnets", Gerhard Winkler, Vieweg Tracts in Pure and Applied Physics, Vol. 5, Braunnschweig 1981, especially pages 358 to 364, and p. 672. See also U.S. Pat. No. 4,981,341.

SUMMARY OF THE INVENTION

The instant invention is embodied in a variable attenuator for light of wavelength $\lambda$, exemplarily 1.55 $\mu$m or 1.3 $\mu$m, and is also embodied in an article (e.g., an optical fiber communication system) that comprises such a variable attenuator.

The prior art contains an optical device that is adapted to support propagation of light of wavelength $\lambda$ in a downstream direction from an input port to an output port through the device. The article further comprises a first and a second polarizer, each polarizer having a polarization direction, with the polarization direction of the second polarizer being substantially 45° from the polarization direction of the first polarizer, with the second polarizer being spaced in the downstream direction from the first polarizer. The article further comprises Faraday rotation means disposed between the first and second polarizer and selected to change, when fully magnetized in the forward propagation direction, the polarization direction of light of wavelength $\lambda$ from a direction parallel to the polarization direction of the first polarizer to a direction substantially parallel to the polarization direction of the second polarizer. The article still further comprises a magnet selected to substantially magnetically saturate the Faraday rotation means in a predetermined direction, and also comprises heating and/or cooling means selected for varying a temperature of the Faraday rotation means.

Significantly, the optical device is a variable optical attenuator for said light of wavelength $\lambda$. The Faraday rotation means comprise a magnetooptic body having a chemical composition that varies in the downstream direction, the chemical composition selected such that the magnetooptic body comprises a compensation wall that is movable in response to a change in the temperature of the magnetooptic body, whereby the attenuation of the light of wavelength $\lambda$ is changed.

In a preferred embodiment, the composition of the magnetooptic body (typically a RIG) varies substantially continuously along the downstream (axial) direction. Desirably, the composition is selected such that the variable attenuator has a gradient in compensation temperature of $\pm\Delta T$ (e.g., $\pm 5°$ C.) about a center temperature. The center temperature exemplarily is an expected operating temperature $T_o$, e.g., room temperature ($\sim 22°$ C.). At the operating temperature the attenuator has a predetermined attenuation $Z_o$ (e.g., 0.1 dB), and changing the temperature of the magnetooptic body, e.g., by means of a thermoelectric cooler and heater combination results in a predetermined change in the attenuation.

In order to substantially reduce hysteresis, it is desirable that a compensation wall is always present. Exemplarily this is assured by growth of a thin layer of either high or low (depending on the direction of the composition gradient) compensation temperature material on one of the major surfaces of the magnetooptic element. Typically, a permanent magnet provides the magnetic field that is required to move the compensation wall in response to a temperature change. The higher the applied field, the lower will generally be undesirable hysteresis effects. On the other hand, the cost of a permanent magnet increases with increasing field strength. Thus, a compromise will typically be required. Some simple experiments will generally suffice to determine an acceptable magnet strength. An electromagnet of course could also be used to provide the desired magnetic field.

By way of example, a variable attenuator according to the invention can be advantageously used for automatic gain control in a WDM optical fiber communication system with a fiber amplifier, or for stabilizing the output level of a fiber amplifier.

The figures are not to scale or in proportion.

DETAILED DESCRIPTION

Figure 7:
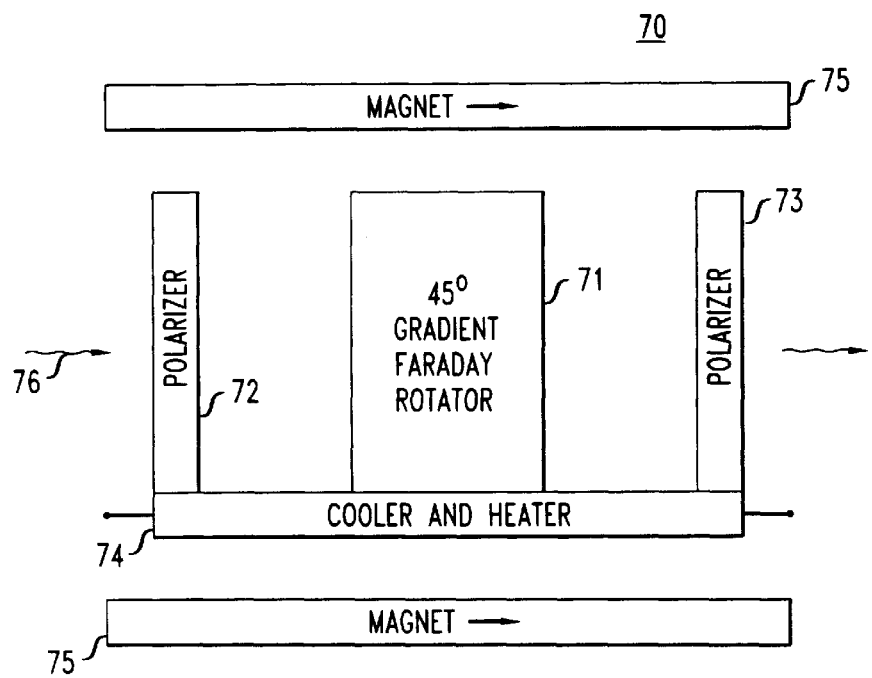
FIG. 7 schematically depicts a variable attenuator according to the invention.

FIG. 7 schematically depicts an exemplary variable attenuator 70 according to the invention. Numeral 71 refers to a magnetooptic body (typically a 45° Faraday rotator with appropriate compositional variation), numerals 72 and 73 refer, respectively, to a first polarizer that defines the 0° polarization direction and a second polarizer that has polarization direction 45° from the 0° direction, and numeral 74 refers to a thermoelectric (TE) cooling plus heating device. The magnetooptic body is heat-conductively attached to the TE device. Numerals 75 refer to a magnet, exemplarily a tubular permanent magnet of strength sufficient to magnetically saturate the Faraday rotator. Light 76 is incident on the first polarizer and propagates in axial direction (downstream) through the variable attenuator.

In general, a variable attenuator according to the invention comprises conventional features similar to features found in optical isolators, e.g., one or more optical lenses for conditioning of the light beam, and means for attaching fiber "pig tails" to the device. These features are not shown in FIG. 7.

Figure 1:
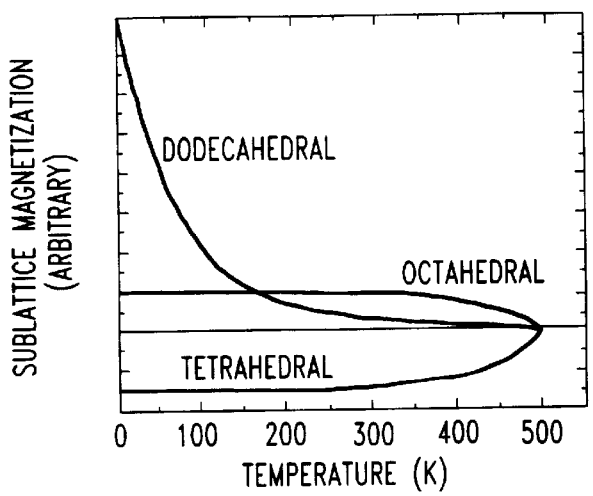
FIGS. 1 and 2 respectively schematically show sublattic magnetization and overall magnetization of a RIG as a function of temperature.
Figure 2:
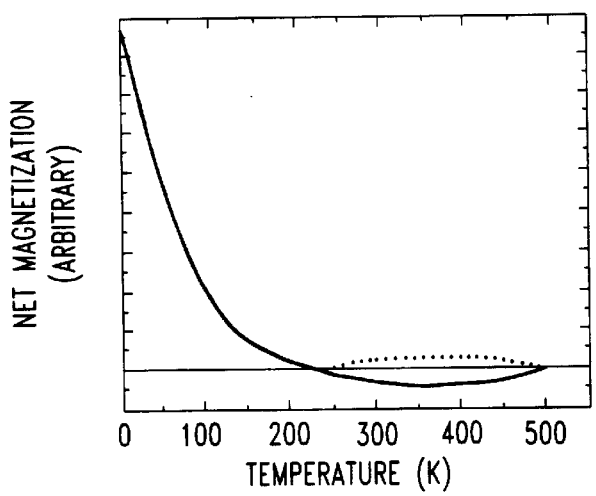
Figure 3:
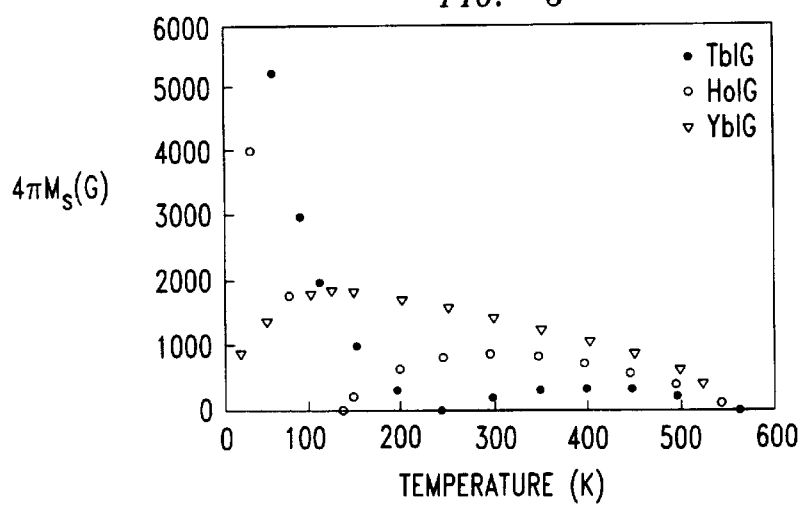
FIG. 3 shows exemplary data on saturation magnetization as a function of temperature, for 3 different RiGs.
Figure 4:
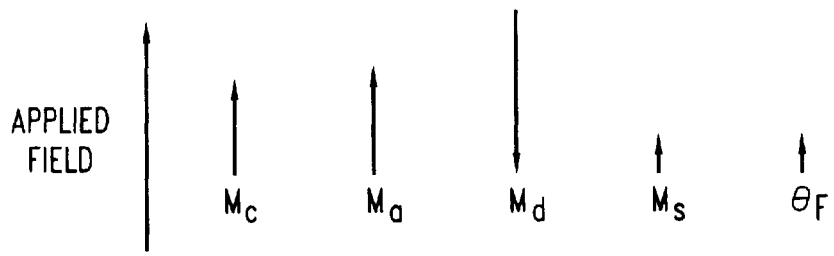
FIGS. 4 and 5 schematically show sublattice magnetiziation, overall magnetization and Faraday rotation of an exemplary RIG below and above the compensation temperature.
Figure 5:
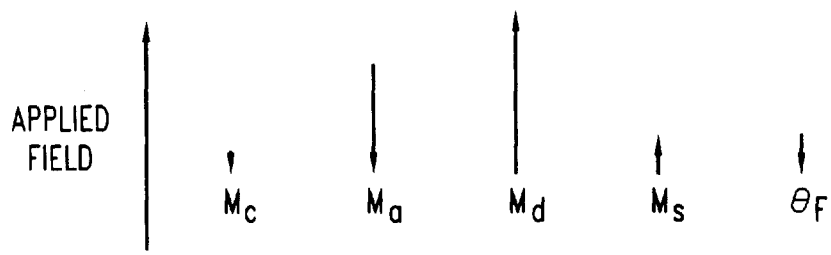
Figure 6:
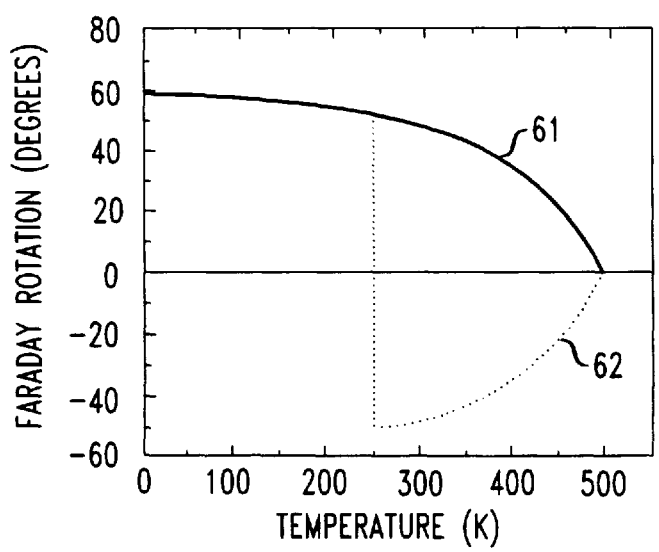
FIG. 6 schematically shows Faraday rotation as a function of temperature for a compensation point RIG.

FIG. 6 schematically shows Faraday rotation as a function of temperature for a compensation point material, with curve 61 pertaining to the case of zero applied magnetic field in a coercive material, and 62 to an applied field. FIG. 6 illustrates the change of sign of the Faraday rotation at the compensation temperature. It is this change of sign that underlies the utility of magnetooptic material with an appropriate compensation temperature for variable attenuators.

In preferred embodiments of the invention, the magnetooptic body has a composition gradient about a central composition. Exemplarily the central composition is approximately $Bi_{1.2}Eu_{0.9}Ho_{0.9}Fe_{4.0}Ga_{1.0}O_{12}$. This composition is expected to have a compensation temperature of approximately 22° C. However, by adjustment of the Ga/Fe ratio, the central temperature can be set to other desired operating temperatures. A gradient in the compensation temperature can be introduced inter alia by a gradient in the Bi/(Eu+Ho) ratio in the body. Because Bi is not magnetic while Eu and Ho are magnetic, changing the Bi/(Eu+Ho) ratio changes the c-lattice contribution to the magnetization and thereby affects the compensation temperature.

If, for example, a total gradient of 10° C. were desired in the compensation temperature (i.e., ±5° C. from the central operating temperature), this would require a total gradient of approximately 0.032 atoms per formula unit of Bi (corresponding to ±0.016 atoms per formula unit of Bi). Similar materials could, for instance, be made from the Bi—Tb and Bi—Ho systems.

By way of example, below are given some compositions that are expected to have utility in variable optical attenuators according to the invention.

TABLE I

| Low Temp. T = 17° C. | Center $T_o$ = 22° C. | High Temp T = 27° C. |
|---|---|---|
| $Bi_{1.184}Eu_{0.908}Ho_{0.908}Fe_{4.0}Ga_{1.0}O_{12}$ | $Bi_{1.2}Eu_{0.9}Ho_{0.9}Fe_{4.0}Ga_{1.0}O_{12}$ | $Bi_{1.216}Eu_{0.892}Ho_{0.892}Fe_{4.0}Ga_{1.0}O_{12}$ |
| $Bi_{1.16}Tb_{1.84}Fe_{4.35}Ga_{0.65}O_{12}$ | $Bi_{1.2}Tb_{1.8}Fe_{4.35}Ga_{0.65}O_{12}$ | $Bi_{1.24}Tb_{1.76}Fe_{4.35}Ga_{0.65}O_{12}$ |
| $Bi_{1.175}Ho_{1.825}Fe_{4.2}Ga_{0.8}O_{12}$ | $Bi_{1.2}Ho_{1.8}Fe_{4.2}Ga_{0.8}O_{12}$ | $Bi_{1.225}Ho_{1.775}Fe_{4.2}Ga_{0.8}O_{12}$ |

The above compositions are exemplary only, and other materials with different center temperatures and/or gradients could be devised, depending inter alia on the desired operating range and sensitivity of the variable attenuator.

RIGs for use in a variable optical attenuator according to the invention can be grown by a technique substantially as described in U.S. Pat. No. 5,608,570. However, to achieve the desired composition gradient typically requires a variation of the prior art procedure.

For instance, by ramping the growth temperature down (or up) during a liquid phase epitaxy growth run, the undercooling of the melt can be varied smoothly. Since Bi concentration is approximately a linear function of undercooling for a given melt (see, for instance, C. -P Klages et al., *J. Crystal Growth*, Vol. 64, p. 275 (1983)), the desired composition gradient can be established.

The Bi concentration can also be varied by varying the rotation rate. Theory predicts a Bi concentration that varies as the square root of the rotation rate. However, we have found that for rotation rates in the approximate range 4014 160 rpm, little change occurs in the distribution coefficient of Bi. Rotation rates below about 40 are found to be effective in reducing the Bi concentration, with zero rotation generally not being indicated, due to insufficient stirring of the melt. In previous work it was shown that a change of 0.02–0.05 Bi atoms/formula unit is readily achievable by variation of the film rotation rate.

RIGs according to the invention are typically grown as single crystal film on a substrate, e.g., calcium magnesium zirconium substituted gadolinium gallium garnet (CMZ:GGG) of lattice parameter 12.498A. Such substrates are commercially available.

Figure 8:
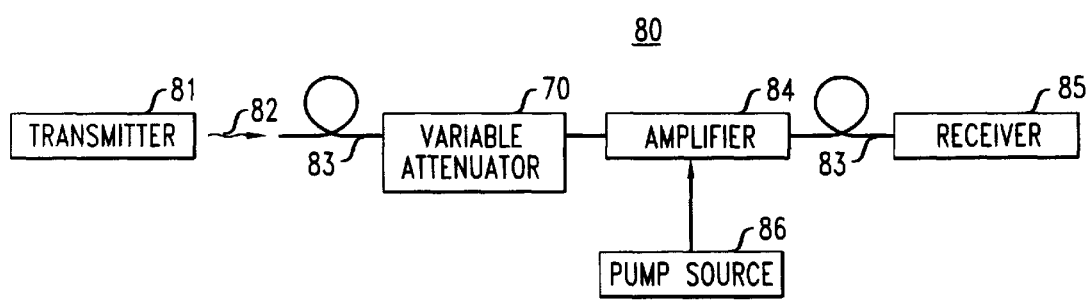
FIG. 8 schematically depicts an exemplary optical communication system according to the invention.

FIG. 8 schematically depicts an exemplary optical fiber communication system 80. The system comprises a conventional transmitter 81, a conventional receiver 85, and an optical fiber transmission path (including transmission fiber 83) that signal-transmissively connects the transmitter and receiver, and comprises conventional optical fiber amplifier 84 and variable attenuator according to the invention 70. Pump source 86 provides pump light to the amplifier. It will be understood that the presence of a fiber laser in the transmission path is optional, and that other optical components (e.g., a router) could be present. The communication system typically is a multichannel (WDM) system.

We claim:

1. An article comprising an optical device adapted for propagation of light of wavelength $\lambda$ in a downstream direction from an input port to an output port through the device, wherein the article further comprises a) a first and a second polarizer, each polarizer having a polarization direction, with the polarization direction of the second polarizer being substantially 45° from the polarization direction of the first polarizer, the second polarizer being spaced in the downstream direction from the first polarizer;

b) Faraday rotation means disposed between said first and second polarizers and selected to change, when fully magnetized in the forward propagation direction, the polarization direction of light of wavelength $\lambda$ from a direction parallel to the polarization direction of the first polarizer to a direction substantially parallel to the polarization direction of the second polarizer; and c) a magnet selected to magnetically substantially saturate the Faraday rotation means in a predetermined direction;

CHARACTERIZED IN THAT d) the optical device is a variable optical attenuator and comprises heating and/or cooling means selected for varying a temperature of the Faraday rotating means; and d) the Faraday rotation means comprise a magneto-optic body having a chemical composition that varies in the downstream direction, the Faraday rotation means comprising a compensation wall that is movable in response to a change in the temperature of the magnetooptic body, whereby the attenuation of the light of wavelength $\lambda$ in the device is changed.

2. Article according to claim 1, wherein the chemical composition of the magneto-optic body varies substantially continuously in the downstream direction.

3. Article according to claim 1, wherein the chemical composition is selected such that the variable optical attenuator has a gradient in compensation temperature of $\pm\Delta T$ degrees about a center temperature.

4. Article according to claim 3, wherein the center temperature is an expected operating temperature $T_o$ of the variable optical attenuator.

5. Article according to claim 3, wherein $\Delta T$ is about 5° or less.

6. Article according to claim 1, wherein the Faraday rotation means comprise a rare earth iron garnet.

7. Article according to claim 6, wherein said rare earth iron garnet consists substantially of Bi, Eu, Ho, Fe, Ga and oxygen, the composition selected to provide the composition with a compensation temperature of about 22° C.

8. Article according to claim 6, wherein said rare earth iron garnet consists substantially of Bi, Tb, Fe, Ga and oxygen.

9. Article according to claim 6, wherein said rare earth iron garnet consists substantially of Bi, Ho, Fe, Ga and oxygen.

10. Article according to claim 6, wherein said rare earth iron garnet is disposed on a substrate.

11. Article according to claim 10, wherein said substrate comprises calcium magnesium zirconium substituted gadolinium gallium garnet, to be referred to as CMZ:GGG.

12. Article according to claim 11, wherein said CMZ:GGG is selected to have a lattice parameter of about 1.2498 nm.

13. Article according to claim 1, wherein the article is an optical fiber communication system comprising a transmitter, a receiver, an optical fiber transmission path signal transmissively connecting said transmitter and receiver and comprising said variable optical attenuator.

\* \* \* \* \*